US012766817B2

(12) United States Patent
Furuta et al.

(10) Patent No.: US 12,766,817 B2
(45) Date of Patent: Oct. 20, 2026

(54) DECORATIVE MATERIAL AND DECORATIVE MEMBER

(71) Applicant: DAI NIPPON PRINTING CO., LTD., Tokyo (JP)

(72) Inventors: Satoshi Furuta, Asaka (JP); Mayuko Komurasaki, Misato (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 517 days.

(21) Appl. No.: 17/641,024

(22) PCT Filed: Sep. 11, 2020

(86) PCT No.: PCT/JP2020/034461
§ 371 (c)(1),
(2) Date: Mar. 7, 2022

(87) PCT Pub. No.: WO2021/049611
PCT Pub. Date: Mar. 18, 2021

(65) Prior Publication Data

US 2022/0324209 A1 Oct. 13, 2022

(30) Foreign Application Priority Data

Sep. 13, 2019 (JP) ................................ 2019-167143

(51) Int. Cl.
*B32B 27/32* (2006.01)
*B32B 7/12* (2006.01)
(Continued)

(52) U.S. Cl.
CPC ................ *B32B 27/08* (2013.01); *B32B 7/12* (2013.01); *B32B 27/16* (2013.01); *B32B 27/22* (2013.01);
(Continued)

(58) Field of Classification Search
CPC ....... B32B 7/12; B32B 27/32; B32B 2451/00; B32B 2419/00; B32B 2307/7246; B32B 2307/54
See application file for complete search history.

(56) References Cited

U.S. PATENT DOCUMENTS 5,973,071 A * 10/1999 Modic .................. C08L 53/025
525/240
6,465,104 B1 * 10/2002 Krebs .................. C08G 18/12
525/131

(Continued)

FOREIGN PATENT DOCUMENTS

JP S58-14312 B2 3/1983
JP 2010-234763 A 10/2010

(Continued)

OTHER PUBLICATIONS

Machine translation of JP2013203061 A, retrieved Aug. 24, 2024. (Year: 2013).*
Aug. 25, 2023 Extended European Search Report Issued in European Patent Application No. 20862064.1.
Nov. 24, 2020 Search Report issued in International Patent Application No. PCT/JP2020/034461.
Feb. 18, 2023 Office Action Issued in Chinese Patent Application No. 202080063646.8.

*Primary Examiner* — Callie E Shosho
*Assistant Examiner* — Krupa Shukla
(74) *Attorney, Agent, or Firm* — Oliff PLC

(57) ABSTRACT

A decorative material which has excellent application suitability with a high initial tight contact strength in the application process and achieves the excellent long-term adhesion free from the delamination even when used for a long term, and a decorative member having the excellent long-term adhesion. A decorative material obtained by applying decoration treatment to a substrate, and having a water vapor transmission rate when measured in accordance with Testing Methods for Determination of the Water Vapor Transmission Rate of Moisture-Proof Packaging Materials (Dish Method) defined in JIS Z0208:1976 of not less than 0.75 $g/m^2 \cdot 0.24$ h and not more than 45 $g/m^2 \cdot 0.24$ h, and a
(Continued)

decorative member including the decorative material and a base body with an adhesive layer disposed therebetween such that the substrate of the decorative material and the base body face each other.

8 Claims, 2 Drawing Sheets

(51) Int. Cl.

| | |
|---|---|
| ***B32B 27/08*** | (2006.01) |
| ***B32B 27/16*** | (2006.01) |
| ***B32B 27/22*** | (2006.01) |
| ***B32B 27/30*** | (2006.01) |
| ***E04F 13/18*** | (2006.01) |

(52) U.S. Cl.

CPC ............ *B32B 27/304* (2013.01); *B32B 27/32* (2013.01); *E04F 13/18* (2013.01); *B32B 2250/02* (2013.01); *B32B 2250/242* (2013.01); *B32B 2255/10* (2013.01); *B32B 2255/26* (2013.01); *B32B 2255/28* (2013.01); *B32B 2307/412* (2013.01); *B32B 2307/54* (2013.01); *B32B 2307/7246* (2013.01); *B32B 2307/732* (2013.01); *B32B 2419/00* (2013.01); *B32B 2451/00* (2013.01)

(56) References Cited

U.S. PATENT DOCUMENTS

| | | | | |
|---|---|---|---|---|
| 2011/0098423 | A1* | 4/2011 | Fujiishi | C08F 10/00<br>526/348 |
| 2017/0011816 | A1* | 1/2017 | Choi | C08L 53/00 |
| 2018/0022076 | A1* | 1/2018 | Ueno | B32B 27/36<br>428/336 |
| 2022/0347983 | A1* | 11/2022 | Furuta | B32B 27/32 |

FOREIGN PATENT DOCUMENTS

| | | | |
|---|---|---|---|
| JP | 2012-51203 | A | 3/2012 |
| JP | 5092793 | B2 | 12/2012 |
| JP | 2013-78955 | A | 5/2013 |
| JP | 2013-203061 | A | 10/2013 |
| JP | 2015-052090 | A | 3/2015 |
| JP | 2018-171884 | A | 11/2018 |
| JP | 2018-171920 | A | 11/2018 |
| JP | 2018-187877 | A | 11/2018 |
| WO | 2016/125907 | A1 | 8/2016 |
| WO | 2020/067469 | A1 | 4/2020 |
| WO | 2020/067569 | A1 | 4/2020 |

* cited by examiner

[Fig. 1]
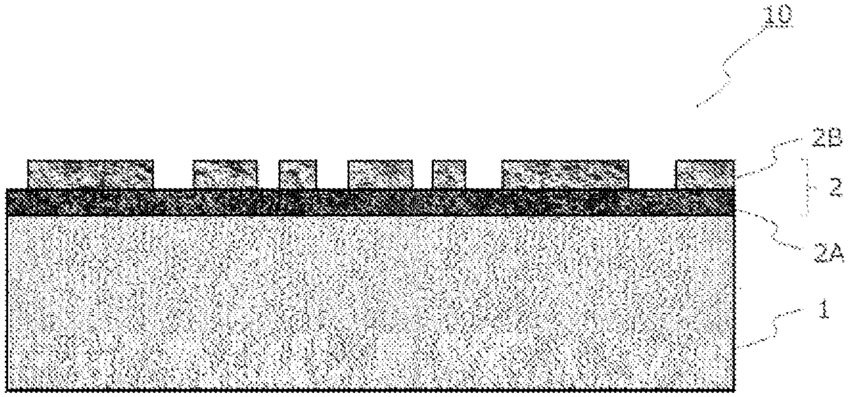
[Fig. 2]
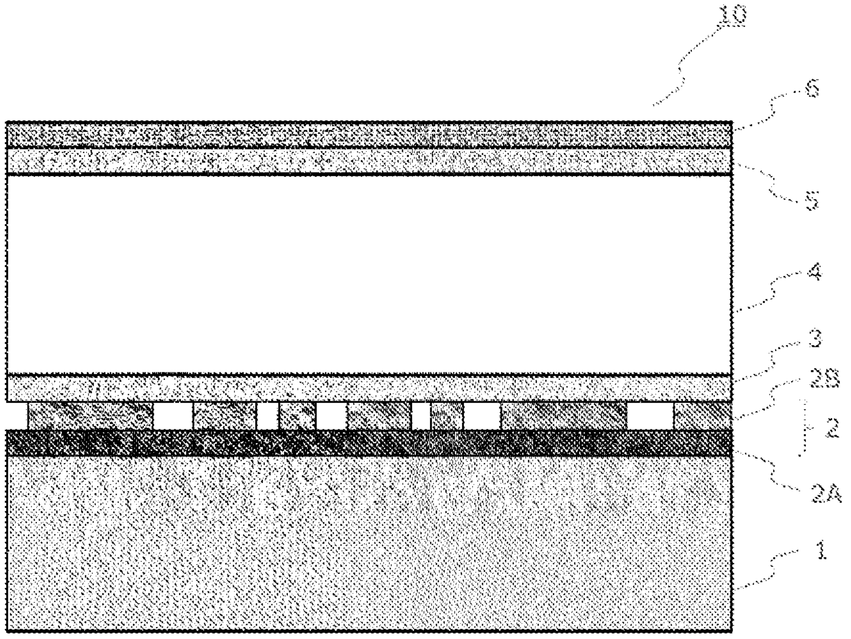

[Fig. 3]
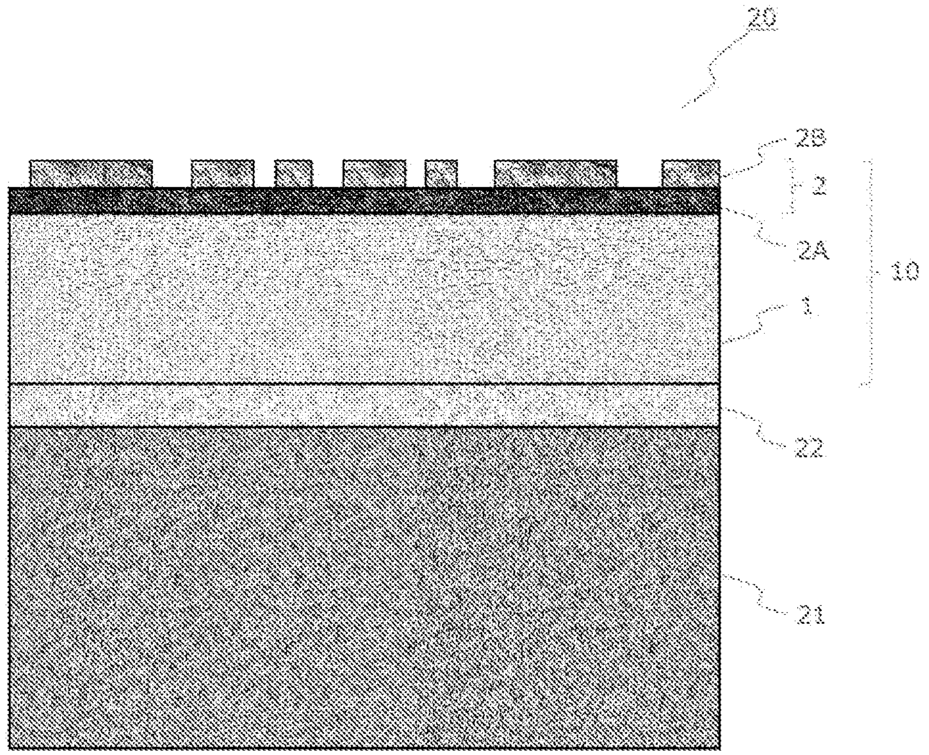

DECORATIVE MATERIAL AND DECORATIVE MEMBER

TECHNICAL FIELD

The present invention relates to a decorative material and a decorative member.

BACKGROUND ART

There are cases where a decorative plate is disposed on the surface of an interior member of an architectural structure such as a wall, a ceiling, and a floor; a window frame; various doors such as a front door; fittings or a fixture member such as a handrail, a skirting board, a crown molding, a window frame, a door frame, and a cable cover; a kitchen; furniture; a light electrical appliance; a cabinet of an OA instrument, etc. Examples of the decorative plate include a decorative member obtained by attaching a decorative material to various base bodies such as a resin member, a wood member, and a metal member, or a decorative material. A decorative material having a structure in which a surface protective layer is disposed on a substrate, such as a sheet-like decorative material (also referred to as a "decorative sheet"), is used as such a decorative material.

Such a decorative material includes a plastic product or the like using a decorative sheet having, for example, a polyvinyl chloride sheet as the substrate and a decorative layer, a surface protective layer and the like are optionally provided as decoration treatment (see, for example, PTL 1).

CITATION LIST

Patent Literature

PTL 1: JP 58-14312B

DISCLOSURE OF INVENTION

Technical Problem

However, when a decorative material such as the decorative sheet of the above PTL 1 is attached to the base body to produce the decorative member, an insufficient initial tight contact strength may raise the problem of causing the delamination at an end surface of the decorative material, so-called springback. A decorative material causing the springback has inadequate application suitability.

On the other hand, when the above decorative member produced by attaching the decorative material to the base body has been used, the problem may arise that delaminates the decorative material from the base body caused by degradation of the substrate constituting the decorative material provided on the outermost surface and degradation of an adhesive for adhesion of the decorative material to the base body due to the impacts from moisture in the atmosphere, wind and rain, and further ultraviolet by the solar radiation or the like.

The present invention has been accomplished under such circumstances and aims to provide a decorative material which has excellent application suitability with a high initial tight contact strength in the application process and achieves the excellent long-term adhesion free from the delamination even when used for a long term, and to provide a decorative member having the excellent long-term adhesion.

Solution to Problem

The present inventors have found that the above object can be achieved by the invention of the decorative material having the following constitution through intensive studies to achieve the above object.

1. A decorative material obtained by applying decoration treatment to a substrate, and having a water vapor transmission rate when measured in accordance with Testing Methods for Determination of the Water Vapor Transmission Rate of Moisture-Proof Packaging Materials (Dish Method) defined in JIS Z0208:1976 of not less than 0.75 $g/m^2 \cdot 0.24$ h and not more than 45 $g/m^2 \cdot 24$ h.
2. The decorative material according to the above 1, wherein the substrate is constituted by at least one resin selected from a vinyl chloride resin and a polyolefin resin.
3. The decorative material according to the above 1 or 2, further comprising a surface protective layer at the outermost surface.
4. The decorative material according to the above 3, wherein the surface protective layer is a layer constituted by a cured product of a curable resin.
5. The decorative material according to any one of the above 1 to 4, wherein the decoration treatment is performed by a decorative layer, and the decorative material comprises the decorative layer, an adhesion layer, a resin layer, and a primer layer in the order of the substrate, the decorative layer, the adhesion layer, the resin layer, and the primer layer.
6. The decorative material according to any one of the above 1 to 5, wherein a tensile modulus at 60° C. is not less than 80 MPa and not more than 600 MPa.
7. A decorative member comprising the decorative material according to any one of the above 1 to 6 and a base body with an adhesive layer disposed therebetween such that the substrate of the decorative material and the base body face each other.
8. The decorative member according to the above 7, wherein the adhesive layer is constituted by a urethane adhesive.
9. The decorative member according to the above 8, wherein the urethane adhesive is a moisture curing adhesive.
10. The decorative member according to any one of the above 7 to 9, wherein the base body is a resin base body or a metal base body.

Advantageous Effects of Invention

According to the present invention, it is possible to provide a decorative material which has excellent application suitability with a high initial tight contact strength in the application process and achieves the excellent long-term adhesion free from the delamination even when used for a long term, and a decorative member having the excellent long-term adhesion.

BRIEF DESCRIPTION OF DRAWINGS

FIG. 1 is a schematic cross-sectional view illustrating an embodiment of a decorative material according to the present embodiment.

FIG. 2 is a schematic cross-sectional view illustrating an embodiment of a decorative material according to the present embodiment.

FIG. 3 is a schematic cross-sectional view illustrating an embodiment of a decorative member according to the present invention.

DESCRIPTION OF EMBODIMENTS

[Decorative Material]

The embodiments of the present invention (hereinafter, referred to as the "present embodiment") are described below. In the present Description, the numerical values according to "not less than" and "not more than" pertaining to the numerical ranges are numerical values that can be in any combinations. In the present Description, the numerical values in Examples can be used for the upper limit and the lower limit of a numerical range.

The decorative material of the present embodiment is obtained by applying decoration treatment to a substrate and has a water vapor transmission rate, when measured in accordance with Testing Methods for Determination of the Water Vapor Transmission Rate of Moisture-Proof Packaging Materials (Dish Method) defined in JIS Z0208:1976, of not less than 0.75 $g/m^2·0.24$ h and not more than 45 $g/m^2·0.24$ h.

The decorative material of the present embodiment achieves a high initial tight contact strength in the application process thereof when a water vapor transmission rate is in a particular range. It is therefore possible for the decorative material of the present embodiment to prevent the delamination at an end surface of the decorative sheet during the application due to an insufficient initial tight contact strength, so-called springback, and thus good application suitability can be obtained. On the other hand, in the case of forming a decorative member using the decorative material and a base body via an adhesive layer, the degradation of the adhesive layer between the decorative material and the base body can be mainly prevented, and consequently the delamination caused by such a degradation is prevented to thus achieve the excellent long-term adhesion free from the delamination even when used for a long term. Thus, the water vapor transmission rate of the decorative material of the present invention being in a particular range enables the compatibility between the excellent application suitability due to a high initial tight contact strength in the application process and the long-term adhesion free from the delamination even when used for a long term.

The decorative material of the present embodiment has a water vapor transmission rate of not less than 0.75 $g/m^2·0.24$ h and not more than 45 $g/m^2·0.24$ h. An effect achieved by such a water vapor transmission rate is described in greater detail. When a water vapor transmission rate is less than 0.75 $g/m^2·0.24$ h, an adhesion failure caused by insufficient curing of an adhesive used in an adhesive layer is liable to occur during the formation of a decorative member by attaching the decorative material to the base body via the adhesive layer. Consequently, an excellent initial adhesive strength cannot be obtained, failing to obtain the excellent application suitability. On the other hand, when a water vapor transmission rate is more than 45 $g/m^2·0.24$ h, the degradation of a substrate and degradation of an adhesive used in the adhesive layer by hydrolysis thereof are caused in long-term use due to the impacts from moisture in the atmosphere, wind and rain, and further ultraviolet by the solar radiation, likely leading to the delamination between the decorative material and the base body, failing to obtain the long-term adhesion free from the delamination even when used for a long term. Thus, as already described, when the decorative material of the present embodiment has a water vapor transmission rate in a particular range, the excellent application suitability due to a high initial tight contact strength in the application process and the long-term adhesion free from the delamination even when used for a long term can be compatible.

From the viewpoint of enhancing the long-term adhesion and the application suitability, the water vapor transmission rate is not less than 1.2 $g/m^2·0.24$ h, more preferably 1.5 $g/m^2·0.24$ h, even more preferably not less than 2.5 $g/m^2·0.24$ h, and even furthermore preferably not less than 4.5 $g/m^2·0.24$ h, and the upper limit is preferably 40 $g/m^2·0.24$ h or less, more preferably 35 $g/m^2·0.24$ h or less, even more preferably 30 $g/m^2·0.24$ h or less, and even furthermore preferably 20 $g/m^2·0.24$ h or less.

In the present embodiment, the water vapor transmission rate can be mainly adjusted by the type of a material constituting the below-described substrate, and in the case of having a resin layer, the type of a material constituting the resin layer.

The structure of the decorative material of the present embodiment is described using FIGS. 1 and 2.

FIG. 1 is a schematic cross-sectional view illustrating an embodiment of a layer structure of a decorative material according to the present embodiment, and shows that a decorative material 10 of the present embodiment has a substrate 1 and a decorative layer 2 as a representative embodiment of decoration treatment.

FIG. 2 is a schematic cross-sectional view illustrating an embodiment of a preferred layer structure of a decorative material according to the present embodiment, and shows that the decorative material has a substrate 1, a decorative layer 2, an adhesion layer 3, a resin layer 4, a primer layer 5, and a surface protective layer 6.

Each layer constituting the decorative material of the present embodiment is described below in greater detail.

(Substrate 1)

There is no limitation on the material for the substrate and any material generally used for the substrate of a decorative material can be used as long as a water vapor transmission rate when constituting the decorative material is within the above predetermined ranges. Examples of materials for the substrate representatively include substrates made of paper, a non-woven fabric or a woven fabric, a resin, a wood, a metal, and a non-metal inorganic material, and a substrate made of a resin is preferred from the viewpoints of adjusting a water vapor transmission rate to be in the above ranges and enhancing the long-term adhesion and the application suitability.

There is also no limitation on the thickness of the substrate as long as a water vapor transmission rate when constituting the decorative material is within the above predetermined ranges, and a film, a sheet, or a plate-like form can be appropriately used depending on the intention. A substrate having a thickness of generally about not less than 20 μm and not more than 200 μm in the form of a film or a sheet, and about not less than 500 μm and not more than 10 cm in the form of a plate, is used in view of the water vapor transmission rate of the decorative material.

Examples of the resin include a resin substrate made of a thermoplastic resin such as polyolefin resins such as a polypropylene resin and a polyethylene resin; polyester resins such as polyethylene terephthalate (PET), polybutylene terephthalate (PBT), polyethylene naphthalate (PEN), an ethylene glycol-terephthalic acid-isophthalic acid copolymer, and a polyester thermoplastic elastomer; acrylic resins such as polymethyl (meth)acrylate, polybutyl (meth) acrylate, and a methyl (meth)acrylate-butyl (meth)acrylate copolymer; a polyester resin, a polycarbonate resin, an acrylonitrile-butadiene-styrene resin (hereinafter also referred to as an "ABS resin"), and a vinyl chloride resin.

In the Description of the present application, for example, the writings such as "(meth)acrylate" and "(meth)acrylic acid" are abbreviations to mean "acrylate or methacrylate", "acrylic acid or methacrylic acid" and the like, respectively.

In view of easily adjusting the water vapor transmission rate to be within the above range, versatility, usability as a decorative material, and the like, and enhancing the long-term adhesion and the application suitability, a polyolefin resin and a vinyl chloride resin are preferred among the above, and also in view of the environmental performance, a polyolefin resin is preferred. In the present embodiment, the above resins can be used singly or in a combination of two or more. In the case of combining two or more, substrates composed of respective single resin can be combined, or two or more resins are mixed to use as a single substrate.

Examples of polyolefin resins include, more specifically, olefin homopolymers such as ethylene, propylene, and butane; various copolymers such as a block copolymer and a random copolymers of ethylene-propylene; copolymers of at least one of ethylene and propylene and at least one of other olefins such as butane, pentane, and hexane; and copolymers of at least one of ethylene and propylene and at least one of other monomers such as vinyl acetate and vinyl alcohol.

From the viewpoints of easily adjusting the water vapor transmission rate to be within the above range and enhancing the long-term adhesion and the application suitability, a polyethylene resin containing ethylene as the constituent unit and a polypropylene resin containing propylene as the constituent unit are preferred among the above, and a polypropylene resin is preferred.

The water vapor transmission rate is easily and reliably adjusted by adjusting the thickness of the layers such as the substrate and the resin layer in which resins are used, hence preferred. In order to adjust the water vapor transmission rate of the decorative material of the present embodiment to the above predetermined range, it is preferred that the thicknesses of the substrate and the resin layer be in predetermined ranges depending on materials, preferably the type of resins, constituting these layers, in view of thickness ratios accounting for the total thickness of the decorative material in the laminate structure of the decorative material.

For easily adjusting the water vapor transmission rate of the decorative material to be within the above predetermined range, the thickness of the substrate, when using a polyethylene resin, a polypropylene resin, and a vinyl chloride resin, may be preferably selected from a range of not less than 40 μm and not more than 200 μm, in view of the laminate structure of the decorative material and an intended water vapor transmission rate.

The polyethylene resin may be, more specifically, an ethylene homopolymer, thus, polyethylene, or may be a copolymer of ethylene and other comonomers copolymerizable with ethylene (e.g. α-olefins such as propylene, 1-butene, 1-hexane, and 1-octane, vinyl acetate, and vinyl alcohol). Examples of polyethylenes include high-density polyethylene (HDPE), medium-density polyethylene (MDPE), low-density polyethylene (LDPE), linear low-density polyethylene (LLDPE), very low-density polyethylene (VLDPE), ultra-high molecular weight polyethylene (UHMWPE), and crosslinked polyethylene (PEX). These polyethylene resins can be used singly or in a combination of two or more.

The polypropylene resin may be a propylene homopolymer, thus, polypropylene, or may be a copolymer of propylene and other comonomers copolymerizable with propylene (e.g. α-olefins such as ethylene, 1-butene, 1-hexane, and 1-octane; vinyl acetate, and vinyl alcohol). These polypropylene can be used singly or in a combination of two or more.

When a propylene homopolymer (polypropylene) is used, a controlled degree of crystallinity can adjust the water vapor transmission rate of the substrate. Generally, the higher a degree of crystallinity, the lower a water vapor transmission rate of the polypropylene resin tends to be. When a polypropylene resin having a thickness in the above range from not less than 40 μm and not more than 200 μm is used as the substrate, the degree of crystallinity thereof is preferably not less than 30%, and more preferably not less than 40%, and the upper limit is preferably 80% or less, and more preferably 70% or less.

Additionally, when a propylene homopolymer (polypropylene) is used, a controlled mass ratio of isotactic polypropylene to atactic polypropylene can also adjust the water vapor transmission rate of the substrate. Generally, when compared with the case where the percentage of the atactic polypropylene in the polypropylene is 100% by mass, the water vapor transmission rate of the substrate can be reduced by adding isotactic polypropylene. In this case, the mass ratio of atactic polypropylene to isotactic polypropylene is preferably not less than 0/100 and not more than 20/80 in view of easily adjusting the water vapor transmission rate.

When a vinyl chloride resin is used, the vinyl chloride resin can be a homopolymer of a vinyl chloride monomer, thus, polyvinyl chloride, or can be a copolymer obtained by copolymerizing a vinyl chloride monomer with a monomer copolymerizable with the vinyl chloride monomer.

Examples of monomers copolymerizable with a vinyl chloride monomer include vinyl esters such as vinyl acetate and vinyl propionate; acrylates such as methyl acrylate and butyl acrylate; methacrylates such as methyl methacrylate and ethyl methacrylate; maleates such as butyl maleate and diethyl maleate; fumarates such as dibutyl fumarate and diethyl fumarate; vinyl ethers such as vinyl methyl ether, vinyl butyl ether, and vinyl octyl ether; vinyl cyanides such as acrylonitrile and methacrylonitrile; olefins such as ethylene, propylene, butylene, and styrene; dienes such as isoprene and butadiene; vinylidene halides and vinyl halides other than vinyl chlorides such as vinylidene chloride and vinyl bromide; and allyl phthalates such as diallyl phthalate. These monomers can be used singly or in a combination of two or more.

The average degree of polymerization of a vinyl chloride resin is preferably not less than 500 and not more than 4000, more preferably not less than 700 and not more than 3900, and even more preferably not less than 1000 and not more than 3800, from the viewpoint of easily adjusting the water vapor transmission rate to be within the above range and enhancing the long-term adhesion and the application suitability. When an average degree of polymerization is in the above range, excellent mechanical strengths and formability can be obtained. In the present Description, an average degree of polymerization is the average degree of polymerization measured in accordance with JIS K6721.

In the present embodiment, when a vinyl chloride resin is used, it is preferred to add a plasticizer from the viewpoint of easily adjusting the water vapor transmission rate to be within the above range, enhancing the long-term adhesion and the application suitability, and also enhancing the processing properties.

There is no particular limitation on the plasticizer as long as it is compatible with a vinyl chloride resin, and examples include phthalate plasticizers such as dibutyl phthalate (DBP), dioctyl phthalate (DOP), diisononyl phthalate (DINP), diisodecyl phthalate (DIDP), and diundecyl phthalate (DUP); adipate plasticizers such as dibutyl adipate; phosphate plasticizers such as tributyl phosphate, tricresyl phosphate, and triphenyl phosphate; trimellitate plasticizers such as tributyl trimellitate and trioctyl trimellitate; known various polyester plasticizers such as adipate polyesters; and citrates such as acetyl tributyl citrate and acetyl trioctyl citrate. Among them, phthalate plasticizers, adipate plasticizers, and polyester plasticizers are preferred from the viewpoint of easily adjusting the water vapor transmission rate to be within the above range, enhancing the long-term adhesion and the application suitability, and also enhancing the processing properties, and phthalate plasticizers and polyester plasticizers are more preferred. These plasticizers can be used singly or in a combination of two or more.

The content of a plasticizer may be appropriately adjusted depending on an intended water vapor transmission rate but generally, not unconditionally, as an additive for a plasticizer is increased, a water vapor transmission rate of a vinyl chloride resin tends to increase. In view of this point, the content of a plasticizer based on 100 parts by mass of a vinyl chloride resin is preferably not less than 15 parts by mass, more preferably not less than 20 parts by mass, and even more preferably not less than 25 parts by mass, and the upper limit is preferably 50 parts by mass or less, more preferably 45 parts by mass or less, and even more preferably 35 parts by mass or less. When a content of the plasticizer is within the above range, the water vapor transmission rate can be easily adjusted to be within an intended range and the long-term adhesion and the application suitability can be enhanced. When a content of the plasticizer is not less than 20 parts by mass, a vinyl chloride resin can be flexible and the processing properties can be enhanced, whereas a content of the plasticizer is not more than 50 parts by mass, the plasticizer can be prevented from bleeding out, the water vapor transmission rate is easily adjusted to an intended range with stability, and the long-term adhesion and the application suitability can be enhanced.

Especially, from the viewpoint of easily adjusting the water vapor transmission rate to an intended range and enhancing the long-term adhesion and the application suitability, when a phthalate plasticizer is used, the content thereof based on 100 parts by mass of a vinyl chloride resin is preferably not less than 25 parts by mass, more preferably not less than 30 parts by mass, and even more preferably not less than 35 parts by mass, and the upper limit is preferably 50 parts by mass or less, more preferably 45 parts by mass or less, and even more preferably 40 parts by mass or less. When a polyester plasticizer is used, the content thereof based on 100 parts by mass of a vinyl chloride resin is preferably not less than 15 parts by mass, more preferably not less than 18 parts by mass, and even more preferably not less than 20 parts by mass, and the upper limit is preferably 35 parts by mass or less, more preferably 30 parts by mass or less, and even more preferably 25 parts by mass or less.

Examples of the paper substrate include kraft paper, titanium paper, linter paper, sulfuric acid paper, glassine paper, parchment paper, resin impregnated paper, thin paper, and Japanese paper. Examples of the substrate made of a non-woven fabric or a woven fabric include a non-woven fabric or a woven fabric constituted by inorganic fibers such as a glass fiber, an alumina fiber, a silica fiber, and a carbon fiber, and by organic fibers of various synthetic resins such as a polyester resin, an acrylic resin, a polyethylene resin, and a polypropylene resin, and a substrate of a complex thereof, etc.

Examples of the wood include a wood substrate made of a variety of woods such as Japanese cedar, Japanese cypress, pine, oak, lauan, teak and rubber tree. The wood substrate may be in the form of film called wood veneer, or of sheet, or a plate form such as a single wood plate, a plywood plate, a composite wood, a particle board or a wood fiberboard.

Examples of the metal include a metal substrate made of iron, aluminum, copper, tin, titanium, an alloy containing at least one of these metals (e.g. carbon steel, stainless steel, duralumin, brass, and bronze) or the like.

Examples of the non-metal inorganic material include cement, gypsum, a calcium silicate, pottery, glass, and various ceramics.

The substrate may be colored or may not be colored (may be transparent), and when colored, there is no particular limitation on the manner of coloring: either transparent coloring, or opaque coloring (masking coloring) may be employed. These colorings are arbitrarily selected.

When the substrate is colored, examples of colorants include an inorganic pigment such as titanium white, antimony white, iron black, chrome yellow, titanium yellow, red iron oxide, cadmium red, ultramarine blue, or cobalt blue; an organic pigment or dye such as quinacridone red, isoindolinone yellow, phthalocyanine blue, a nickel-azo complex, azomethine azo black pigments, and perylene black pigments; a metal pigment such as scaly foil pieces of aluminum, brass, or the like; and a pearlescent (pearl) pigment such as scaly foil pieces of titanium dioxide-coated mica, basic lead carbonate, or the like. For example, when the surface hue of the base body to which a decorative material is attached is inconsistent and the surface hue needs to be masked to enhance the color stability of a decorative layer to be provided depending on the intention, an inorganic pigment such as a white pigment may be used.

When the resin substrate is colored, either method such as addition (kneading, mixing in) of a colorant to the resin, or formation of a coating by applying a paint containing the resin and a colorant can be used. When the substrate of paper, a non-woven fabric, or a woven fabric is colored, either method such as mixing of a colorant with a pulp or a fibrous material, or forming a coating, or both methods in combination can be used.

The substrate may optionally contain an additive(s). Examples of the additive include an inorganic filler such as calcium carbonate or clay, a flame retardant such as magnesium hydroxide, an antioxidant, a lubricant, a foaming agent, an antioxidant, an ultraviolet absorber, and a light stabilizer. There is no particular limitation on the amount mixed an additive(s) as long as it does not affect the processing characteristic, etc., and it may be appropriately set depending on the required properties, etc.

From the viewpoint of enhancing the weatherability of the decorative material of the present invention, a weathering stabilizer such as an ultraviolet absorber or a light stabilizer is preferably used among the above additives.

Versatile ultraviolet absorbers used for decorative materials can be used as the ultraviolet absorber without limitation, and both organic absorbers and inorganic absorbers can be used. Examples of the organic ultraviolet absorber include a benzotriazole ultraviolet absorber, a benzophenone ultraviolet absorber, a triazine ultraviolet absorber, and a hydroxyphenyl triazine ultraviolet absorber. Versatile light stabilizers used for decorative materials can be used as the light stabilizer without limitation, and examples include a hindered amine light stabilizer such as a piperidinyl sebacate. These ultraviolet absorbers and light stabilizers may have a reactive functional group including an ethylenic double bond such as a (meth)acryloyl group, a vinyl group, or an allyl group in the molecule. Examples of the inorganic ultraviolet absorber include titanium dioxide, ferric oxide, zinc oxide, cerium oxide, and zirconium oxide which have an average particle size of not more than 380 μm, which is the shortest wavelength of visible light, and preferably not more than 100 μm.

These weathering stabilizers such as an ultraviolet absorber and a light stabilizer, and other various additives, can be used singly, or in a combination of two or more.

There is no particular limitation on the shape of the substrate, it is appropriately selected depending on the intention and may be, for example, a flat plate, or may be a non-flat plate such as a curved plate, or an angular plate. FIGS. 1 and 2 show decorative materials of a flat plate (also referred to as "sheet-like"), but the shape of the decorative material of the present invention is not limited thereto. A flat plate is preferred in view of easy production, intended use, easy processing of the decorative material.

The thickness of the substrate is preferably not less than 20 μm, more preferably not less than 30 μm, and even more preferably not less than 40 μm, in view of surface properties such as abrasion resistance, weatherability, and scratch resistance, processing characteristics, and easy handleability. The upper limit is preferably 500 μm or less, more preferably 300 μm or less, and even more preferably 150 μm or less.

One or both surfaces of the substrate may be subjected to surface treatment such as a physical surface treatment or a chemical surface treatment, e.g. by an oxidation method or a surface roughening method to enhance the interlayer adhesion between the substrate and another layer(s) and reinforce the adhesion between the substrate and various types of base bodies, etc.

Examples of the oxidation method include a corona discharge treatment, a chromium oxidation treatment, a flame treatment, a hot air treatment, and an ozone-UV treatment method, and examples of the surface roughening method include a sandblasting method and a solvent treatment method. These surface treatment methods may be appropriately selected depending on the type of the substrate; however, in general, a corona discharge treatment method is preferably used from the viewpoints of the effect, the operability, etc., of the surface treatment.

Further, in order to enhance the interlayer adhesion between the substrate and another layer(s) and reinforce the adhesion between the substrate and various type of base bodies, etc., at least one surface of the substrate may be subjected to processing e.g. to form the below-described primer layer (also referred to as the "easy adhesion layer").

(Decoration Treatment)

The decorative material of the present embodiment is obtained by applying decoration treatment to the substrate. The decoration treatment imparts a design such as a color, a pattern, a roughening patters, etc., to the decorative material of the present embodiment to enhance the design, thereby enabling the decorative material of the present embodiment to be a decorative material.

In the present embodiment, known various forms can be used as the decoration treatment, and usable treatments include, for example, the formation of a decorative layer such as a picture layer and a colored layer by printing or the like, and a metal processing layer and the like by vacuum deposition or the like, and addition of a colorant to the substrate and the below-described resin layer, and the formation (imparting) of a roughening pattern by embossing and the like. Among these, the representative versatile decoration treatment is the formation of a decorative layer.

The formation of a decorative layer is mainly described below as the decoration treatment.

In the decorative material of the present embodiment, the decorative layer as decoration treatment is provided on one surface of the substrate and may be a layer constituted only by an entire surface colored layer 2A provided so that the entire surface thereof is coated (also referred to as the "entire surface solid layer"), or a layer constituted only by a picture layer 2B provided so that a part of the surface thereof is coated to form a picture by a pattern, or a layer constituted by a combination of the entire surface colored layer 2A and the picture layer 2B. From the viewpoint of expressing a more sophisticated design, it is preferred that the decorative layer be a layer constituted by the picture layer and the entire surface colored layer. In this case, the decorative material of the present embodiment preferably includes the substrate, the entire surface colored layer, and the picture layer in this order, and the picture layer may be a single layer, or two or more layers.

There is no particular limitation on the pattern imparted by the decorative layer and a pattern is selected depending on the intention. Examples include a grain pattern imitating the appearance of cut surface of various trees such as Japanese cedar, Japanese cypress, and pine, a stone pattern imitating the rock surface such as a marble pattern (e.g. travertine marble pattern) and a cleavage plane of a granite slab, a fabric pattern imitating a texture pattern and a cloth-like pattern, a leather (grain) pattern expressing a grain of leather, a tile pattern, a brick masonry pattern, hair line, hatched grooves, a satin texture, a sand texture, a letter, a sign, a geometric pattern, and a combination pattern thereof such as a parquetry, a patchwork, and a block pattern. Further examples of combination patterns thereof include a pattern of an artificial stone obtained by mixing rubbles of a stone material such as marble with white cement, setting, and polishing for a marble-like finishing, so-called artificial marble.

While the demand on a design by consumers changes according to a trend and the like, the need for a grain pattern has been always stable, and thus, a grain pattern is preferred as the pattern of the decorative material of the present invention. The grain pattern includes a quartersawn pattern, a woodgrain pattern, a figured pattern, an end surface pattern, and any of which may be used.

The usable formation of the decorative layer includes a picture layer or an entire surface colored layer obtained by laminating an ink or a paint on the entire surface or in an intended pattern by various printing method or the like, or a metal layer obtained by laminating various metal layers made of aluminum, chromium, gold, silver, copper, tin, etc., on the entire surface or in an intended pattern by vacuum deposition, spattering, plating or the like. The form of the particularly versatile decorative layer constituted by a picture layer and/or entire surface colored layer is described below.

The formation of a decorative layer having the form of a picture layer and/or an entire surface colored layer preferably uses at least a binder resin as well as a resin composition containing a colorant such as a pigment or a dye, and can use an appropriate mixture of other components used depending on the intention, such as a deglossing agent, an extender pigment, a stabilizer, an ultraviolet absorber, a light stabilizer, and a solvent. Thus, the decorative layer is a layer containing at least a binder resin, and a colorant such as a pigment or a dye, and can contain other components used depending on the above intention.

There is no particular limitation on the binder resin, and examples preferably include resins such as a urethane resin, an acrylic polyol resin, an acrylic resin, a polyester resin, an alkyd resin, an amide resin, a butyral resin, a styrene resin, a urethane-acrylate copolymer, a vinyl chloride-vinyl acetate copolymer resin, a vinyl chloride-vinyl acetate-acrylate copolymer resin, nitrocellulose (flash cotton), and cellulose acetate. A curable resin such as a two-component curable urethane resin containing various polyols such as an acrylic polyol as the base body material and using various isocyanates as a curing agent can also be used. These binder resins can be used singly or in a combination of two or more.

Examples of the colorant such as a pigment and a dye usable for the decorative layer include the same colorants such as a pigment and a dye as exemplified above as being usable for the substrate, and a colorant is appropriately selected among them depending on an intended picture.

In the present invention, from the viewpoint of more enhancing the design, the decorative layer preferably contains a deglossing agent among the above other components used depending on the intention.

Examples of the deglossing agent include inorganic fillers such as silica, clay, kaolinite, heavy calcium carbonate, light calcium carbonate, precipitating barium sulfate, calcium silicate, synthetic silicate, and a silicate fine powder; and organic fillers such as an acrylic resin, a urethane resin, a nylon resin, and polypropylene, or a urea resin.

When the decorative layer contains a deglossing agent, the decorative layer is less lustrous, enabling a design expression of a visually roughening sense due to a gloss difference.

The grain patterns exemplified as preferred patterns include, for example, a less lustrous (deglossy or low glossy) grain duct part, a higher lustrous (glossy or high glossy) spring wood part, and an even higher lustrous autumn wood part (shining part), etc. The decorative layer can form a high design pattern by combining two or more picture layers such as a picture layer forming a less lustrous grain duct part, a picture layer forming a higher lustrous spring wood part, and a picture layer forming an even higher lustrous autumn wood part. Further, when the deglossing agent is not contained in the entire surface colored layer, or when a content of the deglossing agent in the entire surface colored layer is less than a content of the deglossing agent in the picture layer, the gloss difference between the entire surface colored layer and the picture layer becomes greater, thereby enhancing the design.

The volume average particle size of these deglossing agents is preferably not less than 0.5 μm and not more than 25 μm, more preferably not less than 1 μm and not more than 15 μm, and even more preferably not less than 3 μm and not more than 10 μm.

The content of the deglossing agent based on 100 parts by mass of the binder resin in the decorative layer is preferably not less than 0.5 parts by mass, more preferably not less than 1 part by mass, and even more preferably not less than 2 parts by mass, and the upper limit is generally 100 parts by mass or less, preferably 50 parts by mass or less, more preferably 20 parts by mass or less, and even more preferably 10 parts by mass or less. When a content of the deglossing agent is in the above ranges, the decorative layer becomes visually recognizable as a less lustrous layer thereby enhancing a visually roughening sense due to a gloss difference and enhancing application performance because the resin composition never has a too high thixotropic property, whereby the design consequently enhances.

From the viewpoint of enhancing the weatherability, the decorative layer may contain a weathering stabilizer such as an ultraviolet absorber or a light stabilizer. An ultraviolet absorber and a light stabilizer can be the same as exemplified as being contained in the substrate and are appropriately selected from these depending on the intended performance.

The thickness of the decorative layer is appropriately selected depending on the intended pattern and preferably not less than 0.5 μm, more preferably not less than 1 μm, and even more preferably not less than 2 μm, and the upper limit is preferably 15 μm or less, more preferably 10 μm or less, and even more preferably 8 μm or less.

(Surface Protective Layer 6)

The decorative material of the present embodiment may include a surface protective layer in addition to the above substrate and decorative layer. The surface protective layer is the layer provided on the outermost surface when the decorative material is laminated on various base bodies and used for various intended uses (e.g. an interior member of an architectural structure), thus is the layer provided on the outermost surface side when in use. The surface protective layer is the layer which can protect the decorative material of the present embodiment, thus the layer which can impart surface properties such as stain resistance and abrasion resistance to the decorative material of the present embodiment. From such a viewpoint, the surface protective layer is preferably the layer provided throughout the entire outermost surface on the decorative material of the present embodiment.

The surface protective layer may be constituted by either a thermoplastic resin or a curable resin. From the viewpoints of protecting the decorative material of the present embodiment and obtaining better surface properties such as stain resistance and abrasion resistance, a layer constituted by a curable resin, more specifically, a layer constituted by a cured product of a curable resin, is preferred. The surface protective layer may also be a layer constituted by a combination of a thermoplastic resin and a curable resin. In the present Description, the cured product of a curable resin includes a cured product of a resin composition containing a curable resin.

Examples of the thermoplastic resin include an acrylic resin, a polyester resin, an unsaturated polyester resin, a vinyl chloride-vinyl acetate copolymer, a polyester urethane resin, and a thermoplastic (non-crosslinked) urethane resin.

The curable resin usable include a thermosetting resin, a two-component curable resin, an ionizing radiation-curable resin, and an ionizing radiation-curable resin is preferred from the viewpoint of enhancing surface properties such as stain resistance and abrasion resistance of the decorative material of the present embodiment.

Examples of the thermosetting resin include an acrylic resin, a urethane resin, a phenol resin, a urea melamine resin, an epoxy resin, an unsaturated polyester resin, and a silicone resin. A curing agent is optionally added to a thermosetting resin.

Examples of the two-component curable resin include a two-component curable urethane resin containing a polyol compound as the base body material and using an isocyanate compound as a curing agent, a two-component curable epoxy resin using a curing agent such as amine, a two-component curable urethane-modified acrylic resin, and a two-component curable polyester resin.

The ionizing radiation-curable resin is a resin which is capable of being crosslinked and cured upon irradiation with ionizing radiation and which has an ionizing radiation-curable functional group. The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. The ionizing radiation refers to electromagnetic radiation or charged particle radiation having an energy quantum that can polymerize or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable resin to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group, and from the viewpoints of protecting the decorative material and enhancing the surface properties such as stain resistance and abrasion resistance, an acrylate monomer having an acryloyl group is preferred.

From the same viewpoint, the number of the functional groups is preferably not less than 2, and the upper limit is preferably 8 or less, more preferably 6 or less, and even more preferably 4 or less, and especially preferably 3 or less. These polyfunctional (meth)acrylate may be used singly or in a combination of two or more.

Examples of such a polymerizable monomer preferably include difunctional (meth)acrylate such as ethylene glycol di(meth)acrylate, bisphenol A tetraethoxy diacrylate, bisphenol A tetrapropoxy diacrylate, 1,6-hexanediol diacrylate; tri- or more functional (meth)acrylate such as trimethylolpropane tri(meth)acrylate, pentaerythritol tri(meth)acrylate, pentaerythritol tetra(meth)acrylate, dipentaerythritol tetra (meth)acrylate, dipentaerythritol penta(meth)acrylate, dipentaerythritol hexa(meth)acrylate, and isocyanurate-modified tri(meth)acrylate.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth) acrylate oligomer, a polycarbonate (meth)acrylate oligomer, an acrylic (meth)acrylate oligomer, a polycaprolactone urethane (meth)acrylate oligomer, and polycaprolactone diol urethane (meth)acrylate.

From the viewpoints of protecting the decorative material and further enhancing the surface properties such as stain resistance and abrasion resistance, the number of the functional groups of these polymerizable oligomers is preferably not less than 2, and the upper limit is preferably 8 or less, more preferably 6 or less, and even more preferably 4 or less, and especially preferably 3 or less.

From the same viewpoint, the weight average molecular weight is preferably not less than 500, and more preferably not less than 1,000, and the upper limit is preferably 80,000 or less, and more preferably 50,000 or less. In the present Description, the weight-average molecular weight is measured by GPC analysis and calculated in terms of standard polystyrene.

An additive(s) can be optionally added to the surface protective layer as long as the intended effect of the present invention is not impaired. Examples include a weathering stabilizer such as an ultraviolet absorber and a light stabilizer, an ultraviolet screener, an abrasion resistance enhancer, a polymerization inhibitor, a crosslinking agent, an infrared absorber, an antistatic agent, an adhesion improver, a levelling agent, a thixotropy-imparting agent, a coupling agent, a plasticizer, a defoamer, a filler, an anti-blocking agent, a lubricant, and a solvent. Among these, it is preferred to contain a weathering stabilizer such as an ultraviolet absorber and a light stabilizer.

An ultraviolet absorber and a light stabilizer are appropriately selected and used from the ultraviolet absorbers and the light stabilizers listed as being usable for the substrate.

From the viewpoints of protecting the decorative material of the present embodiment and obtaining better weatherability, the thickness of the surface protective layer is preferably not less than 2 μm, more preferably not less than 3 μm, and even more preferably not less than 4 μm. The upper limit is preferably 15 μm or less, more preferably 10 μm or less, and even more preferably 8 μm or less.

The decorative material of the present embodiment can further include, depending on the intended performance, at least one layer selected from an adhesion layer, a resin layer, and a primer layer, and preferably includes an adhesion layer, a resin layer, and a primer layer. There is no particular limitation on the lamination order of these layers and these layers are provided in an appropriate order depending on the intended performance. In the present embodiment, these layers are generally provided in the order at the opposite side to the side at which the above substrate of the above decorative layer is provided, and it is preferred to provide the substrate, the decorative layer, the adhesion layer, the resin layer, and the primer layer in this order as shown in FIG. 2. When the decorative material includes the surface protective layer, it is preferred to provide the substrate, the decorative layer, the adhesion layer, the resin layer, the primer layer, and the surface protective layer in this order as shown in FIG. 2.

These layers are described.

(Resin Layer 4)

The resin layer is the layer provided to enhance surface properties such as stain resistance and abrasion resistance and to protect the decorative layer of the decorative material of the present embodiment. Thus, in the decorative material of the present embodiment, it is preferred that the resin layer be provided at the opposite side to the side at which the substrate of the decorative layer is provided.

Examples of the resin constituting the resin layer include the resins exemplified above as materials constituting the substrate, polyolefin resins such as polypropylene and polyethylene, polyester resins such as polyethylene terephthalate (PET), polybutylene terephthalate (PBT), polyethylene naphthalate (PEN), an ethylene glycol-terephthalic acid-isophthalic acid copolymer, and a polyester thermoplastic elastomer, acrylic resins such as polymethyl (meth)acrylate, polybutyl (meth)acrylate, a methyl (meth)acrylate-butyl (meth)acrylate copolymer, and resin substrates made of a thermoplastic resin such as a polyester resin, a polycarbonate resin, an acrylonitrile-butadiene-styrene resin (hereinafter also referred to as an "ABS resin"), and a vinyl chloride resin.

For the resin constituting the resin layer, a polyolefin resin and a vinyl chloride resin are preferred, a polyolefin resin is more preferred among above from the viewpoint of easily adjusting the water vapor transmission rate to be in the above range, enhancing the long-term adhesion and the application suitability, and also enhancing surface properties and protecting the decorative layer. These polyolefin resin and vinyl chloride resin may be selected and used from the polyolefin resins and the vinyl chloride resins described above as being usable for the substrate.

The resin layer, as well as the substrate, can be the layer that affects the water vapor transmission rate of the decorative material, and it is therefore preferred to determine the thickness of the resin layer depending on the type of a resin constituting the resin layer.

In order to easily adjust the water vapor transmission rate of the decorative material to be within the above predetermined ranges, the thickness of the resin layer is preferably selected from a range of not less than 40 μm and not more than 200 μm, when a polyethylene resin, a polypropylene resin, and a vinyl chloride resin are used, in view of the lamination structure of the decorative material and the intended water vapor transmission rate.

When a polypropylene resin is used for the resin layer, it is preferred, as well as the substrate, that the degree of crystallinity of the polypropylene resin and the mass ratio of isotactic polypropylene to atactic polypropylene be appropriately adjusted.

The resin layer is preferably transparent from the viewpoint of more clearly and visually recognizing the decorative layer. The transparent includes, in addition to colorless and transparent, colored transparent and translucent. When the resin layer is colored, examples of the colorant preferably include the colorants exemplified above as being usable for the decorative layer, and a colorant in the same color as the decorative layer is preferably used.

The resin layer may optionally contain an additive(s), and it is preferred to use the additives exemplified above as being contained in the substrate and the surface protective layer, among which a weathering stabilizer such as an ultraviolet absorber and a light stabilizer is preferably used. There is no particular limitation on the amount added the additive, and it may be appropriately set depending on the required properties, etc.

An ultraviolet absorber and a light stabilizer are appropriately selected and used from the ultraviolet absorbers and the light stabilizers listed as being usable for the substrate.

The thickness of the resin layer is preferably not less than 10 μm and not more than 150 μm, more preferably not less than 30 μm and not more than 120 μm, and even more preferably not less than 50 μm and not more than 100 μm, from the viewpoints of protecting the decorative layer and enhancing surface properties. It is also preferred that the thickness of the resin layer be thicker than the substrate from the viewpoints of protecting the decorative layer and obtaining excellent surface properties.

One or both surfaces of the resin layer, as well as the substrate, may be subjected to surface treatment such as a physical surface treatment or a chemical surface treatment, for example to enhance the interlayer adhesion between the resin layer and another layer(s).

Further, in order to enhance the interlayer adhesion between the resin layer and another layer(s), one or both surfaces of the resin layer may be subjected to processing e.g. to form a primer layer. This primer layer is described later.

(Adhesion Layer 3)

The adhesion layer is the layer preferably provided when the above resin layer is provided from the viewpoint of enhancing the adhesion between the resin layer and the decorative layer.

Examples of the adhesive to be used for the adhesion layer include a urethane adhesive, an acrylic adhesive, an epoxy adhesive, and a rubber adhesive, and among these, a urethan adhesive is preferred for its adhesive strength. Examples of the urethane adhesive include an adhesive utilizing a two-component curable urethane resin containing various polyol compounds such as polyether polyol, polyester polyol, and acrylic polyol and a curing agent such as the above various isocyanate compounds. An acrylic-polyester-vinyl chloride acetate resin or the like also easily achieves the adhesion when heated and is thus a preferable adhesive capable of maintaining an adhesive strength even when used at a high temperature.

The thickness of the adhesion layer is preferably not less than 0.1 μm and not more than 30 μm, more preferably not less than 1 μm and not more than 15 μm, and even more preferably not less than 2 μm and not more than 10 μm, from the viewpoint of efficiently enhancing the adhesion between the resin layer and the substrate, or the decorative layer.

(Primer Layer 5)

The primer layer is the layer provided to mainly enhance the interlayer adhesion between each of the layers constituting the decorative material of the present embodiment and is also referred as an easy adhesion layer. As shown in FIG. 2, for example, when the primer layer is provided between the resin layer and the surface protective layer, the interlayer adhesion of these layers can be enhanced. FIG. 2 shows an embodiment, but not limited thereto, in which the primer layer is provided between the decorative layer and the surface protective layer and, for example, the primer layer can also be provided between the substrate and the decorative layer.

For example, when the decorative material of the present embodiment is used for a decorative member, a primer layer (also referred to as a "back-side primer layer") can also be provided at the opposite side to the surface on which the decorative layer of the substrate is provided and on the surface facing the base body constituting the decorative member, from the viewpoint of the adhesion enhancement.

The formation of the primer layer preferably uses a resin composition containing at least a binder resin, and the primer resin can use a resin composition containing an appropriate mixture of other components used depending on the intention, such as an extender pigment, a stabilizer, an ultraviolet absorber, a light stabilizer, and a solvent. Thus, the primer layer is the layer which contains at least a binder resin and which may contain other components used depending on the above intention.

The binder resin used for the formation of the primer layer includes the binder resins exemplified above as being usable for the resin composition which may form the decorative layer, and the curable resins exemplified above which may form the surface protective layer can be used, among which a thermosetting resin and a two-component curable resin are preferably used. Further, for example, a mixture of these curable resins and the thermoplastic resins such as flash cotton as exemplified above may also be used.

In the present embodiment, a binder resin is appropriately selected from these resins depending on the intention.

The thickness of the primer layer is preferably not less than 0.1 μm, more preferably not less than 1 μm, and even more preferably not less than 2 μm, and the upper limit is 10 μm or less, more preferably 8 μm or less, and even more preferably 5 μm or less, from the viewpoint of efficiently enhancing the interlayer adhesion.

(Decorative Material Production Method)

The decorative material production method of the present embodiment will now be described with reference to a decorative material which includes a substrate, a decorative layer constituted by an entire surface colored layer and a picture layer, an adhesion layer, a resin layer, a primer layer, and a surface protective layer in this order as shown in FIG. 2, which is a preferred embodiment of the decorative material of present embodiment.

The decorative material of the present embodiment can be produced, for example, through the sequential steps of: providing an entire surface colored layer and a picture layer on a substrate to form a decorative layer; forming an adhesion layer; forming a resin layer; forming a primer layer; and forming a surface protective layer so that the primer layer is coated.

The step of forming the decorative layer is performed by applying on the substrate a resin composition used for the formation of an entire surface colored layer to form an intended entire surface colored layer, and then applying a resin composition used for the formation of a picture layer to form a picture layer. The application of the resin composition is performed by a known method such as gravure printing, bar coating, roll coating, reverse roll coating, or comma coating, and is preferably performed by gravure printing.

A surface treatment, when applied to the substrate, is performed before the formation of the entire surface colored layer, and when the primer layer is provided, a surface treatment is also performed before the formation of the entire surface colored layer. Further, when a back-side primer layer is provided on the surface at the opposite side (back side) to the surface on which the decorative layer of the substrate is provided, the back-side primer layer may be provided either before or after the formation of the decorative layer.

The step of providing an adhesion layer is performed after the formation of the above decorative layer by applying an adhesive on the decorative layer to form an adhesion layer. There is no particular limitation on the application method, and a method is appropriately selected, for example, from the application methods usable for the formation of the above decorative layer.

The step of forming a resin layer can be performed after the formation of the above adhesion layer by adhering to and pressing against a resin composition constituting the resin layer by a method such as extrusion lamination, dry lamination, wet lamination, or thermal lamination, thereby laminating the resin layer.

Subsequently, in the step of forming a primer layer so that the resin layer is coated, the primer layer is formed by applying a resin composition used for the formation of the primer layer on the surface of the above resin layer, and an application method is appropriately selected and used from the above methods of applying the resin composition forming the decorative layer.

The formation of the surface protective layer is performed by applying a resin composition used for the formation of the surface protective layer, preferably a curable resin composition containing a liquid uncured product of a curable resin, to the entire surface of the decorative material and optionally curing.

The application method of the uncured resin composition containing a liquid uncured product is any of the known methods exemplified as the methods of applying the resin composition for the above decorative layer.

Further, the curing method of the uncured resin composition containing a liquid uncured product of a curable resin is selected depending on the type of a curable resin contained in the uncured resin composition. For example, when the uncured resin composition is a resin composition containing a liquid uncured product of a thermosetting resin, heat treatment depending on the thermosetting resin to be used is performed to cure.

When an uncured resin composition containing a liquid uncured product of an ionizing irradiation resin is used, the uncured resin layer formed by applying the uncured resin composition is cured upon irradiation with ionizing radiation, such as an electron beam or an ultraviolet light. When an electron beam is used as the ionizing radiation, the acceleration voltage may be appropriately selected depending on the type of the resin used and the thickness of the layer. It is generally preferred to cure the uncured resin layer at an acceleration voltage of about not less than 70 kV and not more than 300 kV. The exposure dose is preferably at a level at which the crosslinking density of the ionizing radiation-curable resin becomes saturated, and is generally selected within the range of not less than 5 kGy and not more than 300 kGy (not less than 0.5 Mrad and not more than 30 Mrad), preferably within the range of not less than 10 kGy and not more than 50 kGy (not less than 1 Mrad and not more than 5 Mrad).

There is no particular limitation on the electron beam source; various electron beam accelerators, such as a Cockloft-Walton type, a van de Graaff type, a resonance transformer type, an insulated core transformer type, a linear type, a Dynamitron type, and a high-frequency type, can be used.

When an ultraviolet light is used as the ionizing radiation, an ultraviolet light having a wavelength of not less than 190 μm and not more than 380 μm is irradiated. There is no limitation of the ultraviolet light source and, for example, a high pressure mercury lamp, a low pressure mercury lamp, a metal halide lamp, or a carbon arc lamp is used.

Further, after the formation of the surface protective layer, a roughening shape can optionally be imparted by a heat-press molding using an embossing plate. The formation of a roughening shape imparts a sense of touch and enhances the design of the decorative material of the present invention. For example, when a grain pattern is formed using the decorative layer, a grain duct part of the grain pattern and a recessed part of the roughening shape are aligned, thereby enabling the expression of a sophisticated design with a high texture.

The heat-press molding conditions are appropriately adjusted depending on the type of a curable resin to be used with no particular limitation but are typically not less than 100° C. and not more than 200° C. for the temperature, not less than 0.1 MPa and not more than 9.8 MPa for the pressure, and 10 seconds to 120 minutes for the time.

(Property of Decorative Material)

The property of the decorative material of the present embodiment, as already described, is required to have a water vapor transmission rate of not less than 0.75 $g/m^2 \cdot 0.24$ h and not more than 45 $g/m^2 \cdot 0.24$ h. When having such a property, the decorative material of the present embodiment enables the compatibility between the excellent application suitability due to a high initial tight contact strength in the application process and the long-term adhesion free from the delamination even when used for a long term. Preferred ranges are also as already described.

The decorative material of the present embodiment preferably has a tensile modulus at 60° C. of the following ranges, since it is related to occurrence of a non-adhesion portion of the decorative material that interfere with the working suitability and the quality of the decorative member during the bending process, which is often used when forming a decorative member by laminating the decorative material on a base body.

Thus, the decorative material of the present embodiment has a tensile modulus at 60° C. of preferably not less than 80 MPa, more preferably not less than 90 MPa, even more preferably not less than 100 MPa, and even furthermore preferably not less than 110 MPa, and the upper limit is preferably 600 MPa or less, more preferably 500 MPa or less, even more preferably 420 MPa or less, and even furthermore preferably 375 MPa or less. When the decorative material of the present embodiment has the above tensile modulus, the water vapor transmission rate is easily adjusted to be within the above range and the long-term adhesion and the application suitability are easily enhanced. In the present Description, the tensile modulus is measured by the method performed in Examples below.

(Intended Use of Decorative Material)

The decorative material of the present embodiment can be used for various uses as it is, or by being laminated on the base body via the adhesive layer, or by being subjected to a predetermined molding processing or the like. The decorative material of the present embodiment has the excellent application suitability, and therefore can be preferably used for the decorative member obtained by the lamination on the base body via the adhesive layer.

The thus-obtained decorative member is laminated on the base body, such as plates such as flat plates or curved plates, made of a variety of materials, and a sheet (or a film), and preferably used for an interior member of an architectural structure such as a wall, a ceiling, and a floor; or for an exterior member such as an outer wall, a roof, an eaves soffit, a railing, and a gate; for a window frame; for various doors such as a front door, for fittings or a fixture member such as a handrail, a skirting board, a crown molding, a window frame, a door frame, and a cable cover, for a surface decorative plate of a kitchen, furniture, or a light electrical appliance, a cabinet of an OA instrument, etc., and for an interior member or an exterior member of a vehicle.

[Decorative Member]

The decorative member of the present embodiment includes the decorative material and the base body of the present embodiment with an adhesive disposed therebetween such that the substrate of the decorative material and the base body face each other. Thus, the decorative member of the present embodiment includes the substrate, the adhesive layer, and the decorative material in this order.

FIG. 3 shows a decorative member 20 of the present embodiment in which a base body 21 and the decorative material 10 shown in FIG. 1 are laminated via an adhesive layer 22, specifically the decorative member shown includes the base body 21 via the adhesive layer 22 at the opposite side to the side having the decorative layer 2 of the substrate 1 of the decorative material 10. Thus, FIG. 3 shows the decorative member 20 including the base body 21, the adhesive layer 22, the substrate 1, and the decorative layer 2 in this order.

Examples of a preferred embodiment of the decorative member 20 of the present embodiment include a decorative member in which the base body 21 and the decorative material 10 show in FIG. 2 are laminated via the adhesive layer 22. Thus, examples of a preferred embodiment of the decorative member 20 of the present embodiment include a decorative member including the base body 21, the adhesive layer 22, the substrate 1, the decorative layer 2, the adhesion layer 3, the resin layer 4, the primer layer 5, and the surface protective layer 6 in this order.

When the decorative material of the present embodiment has a sheet-(or film-) like substrate, thus, the decorative material of the present embodiment is sheet-(or film-) like, the decorative material is easily laminated on the base body via the adhesive layer, thereby easily obtaining the decorative member of the present embodiment.

There is no particular limitation on the base body, and the base body is appropriately selected depending on the intended member. Examples of the base body include a wood base body such as a single wood plate, a plywood plate, a particle board, an MDF (medium-density fiberboard), made of a variety of woods such as Japanese cedar, Japanese cypress, pine, and lauan; a metal base body such as iron and aluminum; a ceramic base body such as glass, ceramics such as pottery, a non-cement ceramic material such as gypsum, and ALC (autoclaved lightweight concrete) board; a resin base body such as an acrylic resin, a polyester resin, a polystyrene resin, and a polyolefin resin such as polypropylene, an ABS (acrylonitrile-butadiene-styrene copolymer) resin, a phenol resin, a vinyl chloride resin, a cellulose resin, and a rubber. These base bodies can be used singly or in a combination of two or more. The shape of the base body may be a flat plate shape or a three-dimensional shape.

In the present embodiment, the base body is appropriately determined depending on the intended use, but the above resin base bodies and the metal base bodies are preferred.

There is no particular limitation on the adhesive used for the adhesive layer, and a known adhesive can be used and appropriately selected depending on the intended use. Examples of the adhesive used for the adhesive layer preferably include adhesives such as a moisture curing adhesive, an anaerobic curing adhesive, a dry curing adhesive, a UV curing adhesive, a heat-sensitive adhesive (e.g. hot-melt adhesive), and a pressure-sensitive adhesive. A moisture curing adhesive and a heat-sensitive adhesive are preferred in view of the compatibility with the decorative material of the present embodiment having the predetermined moisture vapor transmission rate and the handleability. A moisture curing and heat-sensitive adhesive is more preferred.

A heat-sensitive adhesive is preferred because an adhesive strength rises to a saturation at the same time as a melted liquid adhesive layer is cooled and solidified.

The decorative material of the present embodiment has a water vapor transmission rate of not less than 0.75 $g/m^2 \cdot 0.24$ h. For this reason, a moisture curing adhesive can contact an appropriate moisture in the application process, easily increasing an initial tight contact strength of the adhesive used for the adhesive layer. The decorative material of the present embodiment has a water vapor transmission rate of not more than 45 $g/m^2 \cdot 0.24$ h. For this reason, a moisture curing adhesive does not contact an excess moisture and the decrease in adhesion caused by the degradation associated with the hydrolysis of the moisture curing adhesion can be prevented. As a result, excellent long-term adhesion and the application suitability are easily obtained. A moisture curing adhesive is also preferred for its handleability.

Examples of resins which are usable for these adhesives include an acrylic resin, a urethane resin, a vinyl chloride resin, a vinyl acetate resin, a vinyl chloride-vinyl acetate copolymer, a styrene-acrylate copolymer, a polyester resin, an amide resin, a cyanoacrylate resin, and an epoxy resin. These resins can be used singly or in a combination of two or more. A two-component curable urethane or ester adhesive, using a curing agent such as an isocyanate compound, can also be used.

A gluing agent may also be used for the adhesive layer. An acrylic, urethane, silicone or rubber gluing agent can be appropriately selected and used.

A moisture curing adhesive, which is one of the adhesives preferably used in the present embodiment and has the resin base of a urethane resin, has a prepolymer having an isocyanate group at a molecular end as the essential component. Such a prepolymer is generally a polyisocyanate prepolymer, which has 1 or more isocyanate groups at both molecular ends and is a solid thermoplastic resin at room temperature. Examples of such a polyisocyanate prepolymer include a polyisocyanate prepolymer using a crystalline solid polyester polyol at room temperature as the polyol component and polyisocyanate including 4,4-diphenylmethane diisocyanate or tolylene diisocyanate as the polyisocyanate component.

The adhesive layer can be formed by making the above resin an applicable form, such as a solution or an emulsion, to obtain an adhesive, and applying and drying the adhesive by a method such as a gravure printing method, a screen printing method, or a reverse coating method using a gravure plate.

While there is no particular limitation on the thickness of the adhesive layer, it is preferably not less than 1 μm and not more than 100 μm, more preferably not less than 5 μm and not more than 50 μm, and even more preferably not less than 10 μm and not more than 30 μm from the viewpoint of obtaining excellent adhesiveness.

The decorative member of the present embodiment may be arbitrarily cut, and the front or end surface(s) may be subjected to decoration processing, such as grooving or chamfering, by using a cutting machine such as a router or a cutter. The decorative member of the present embodiment can be used for an interior member of an architectural structure such as a wall, a ceiling, and a floor, or for an exterior member such as an outer wall, a roof, an eaves soffit, a railing, and a gate; for a window frame; for various doors such as a front door; for fittings or a fixture member such as a handrail, a skirting board, a crown molding, a window frame, a door frame, and a cable cover; for the surface decorative plate of a kitchen, furniture, or a light electrical appliance, a cabinet of an OA instrument, etc., and for an interior member or an exterior member of a vehicle.

EXAMPLE

The following examples illustrate the present invention in greater detail but do not intend to limit the scope of the invention.

1. Measurement 1-1. Measurement of Water Vapor Transmission Rate

The water vapor transmission rate was measured on the decorative sheets obtained in Examples and Comparative Examples in accordance with Testing Methods for Determination of the Water Vapor Transmission Rate of Moisture-Proof Packaging Materials (Dish Method) defined in JIS Z0208:1976.

1-2. Measurement of Tensile Modulus

A sheet sample of the decorative materials obtained in Examples and Comparative Examples cut out for a dumbbell test specimen in accordance with JIS K6732:2006 was prepared. The sample was stretched to a certain elasticity under temperature environment of 60° C. using a TENSILON Universal Material Testing Instrument ("TENSILON RTC-1250A (product name)", manufactured by ORIENTEC CORPORATION) under the conditions of a tensile speed of 50 mm/min, a distance between chucks of 80 mm, and a width of 25 mm, and a tensile modulus of the decorative material was measured.

2. Evaluation 2-1. Evaluation of Application Suitability

The decorative materials obtained in Examples and Comparative Examples and a flat plate-shaped base body (material: polyvinyl chloride (PVC)) having a width of 25 mm were attached via an adhesive layer having a thickness of 50 μm obtained by melting a moisture curing and hot-melt urethan resin adhesive (a polyurethane prepolymer having an isocyanate group in the molecule, "1308.20 (product name)", manufactured by TAKA) at 120° C. Subsequently, the adhesive layer was cooled and solidified at room temperature of 23° C. Then, the laminate of the decorative material and the base body was allowed to stand for 1 hour under environment of 90° C. to prepare a sample. The sample was subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 10 mm/min, a peeling direction: 90°, and a distance between chucks: 30 mm, and a peel strength was measured as the initial adhesive strength and evaluated by the following criteria. The evaluation of B or higher is a Pass for the application suitability.

A: peel strength was 1.0 N/mm or more.

B: peel strength was 0.5 N/mm or more and less than 1.0 N/mm.

C: peel strength was less than 0.5 N/mm.

2-2. Evaluation of Long-Term Adhesion

The sample prepared in the above "2-1. Evaluation of Application Suitability" was allowed to stand for 6 weeks under heat and humidity environment of 70° C. 90% RH, then subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 50 mm/min and a peeling direction: 90°, and a peel strength was measured and evaluated by the following criteria. The evaluation of B or higher is a Pass for the evaluation of the long-term adhesion.

A: peel strength of 2.0 N/mm or more.

B: peel strength of 1.0 N/mm or more and less than 2.0 N/mm.

C: peel strength of less than 1.0 N/mm.

2-3. Processing Suitability

When the sample was prepared in the above "2-1. Evaluation of Application Suitability", occurrence of a non-adhesion portion of the decorative material was visually observed at a bending part (bending angle: 1 mmR) during the attachment (lamination) and evaluated by the following criteria. The evaluation of B or higher is a Pass for the processing suitability.

A: No non-adhesion portion was observed at all.
B: Almost no non-adhesion portion was observed.
C: Non-adhesion portion was observed and delaminated.

Example 1

On one surface of the substrate (thickness: 80 μm, polypropylene sheet, polyolefin 1) on both surfaces of which a corona discharge treatment was applied, a decorative layer (thickness: 3 μm) was formed using a printing ink having a two-component curable acrylic-urethan resin as the binder resin by gravure printing. Then, a resin composition containing a two-component curable urethane-flash cotton mixed resin (curing agent: containing 5 parts by mass of hexamethylene diisocyanate based on 100 parts by mass of the mixed resin) was applied onto the other surface of the substrate, thereby forming a back-side primer layer (thickness: 3 μm). Subsequently, a transparent urethane resin adhesive was applied onto the decorative layer to form an adhesion layer (thickness: 3 μm), and a polypropylene resin was melt-extruded by a T-die extruder onto the adhesive thereof to form a transparent resin layer (thickness: 80 μm).

After performing a corona discharge treatment on the surface of the resin layer, a resin composition, in which a composition composed of a polycarbonate urethan-acrylic copolymer and acrylic polyol and hexamethylene diisocyanate are mixed in a mass ratio of 100:5, was applied onto the resin layer and dried, thereby forming a primer layer (thickness: 4 μm).

Subsequently, the following ionizing radiation-curable resin composition was applied onto the primer layer to form an uncured resin layer, and thereafter, the uncured resin layer was irradiated with an electron beam (165 KeV and 5 Mrad (50 kGy)) to be cured, thereby forming a surface protective layer (thickness: 5 μm) to prepare the decorative material.

(Ionizing Radiation-Curable Resin Composition)

Ionizing radiation-curable resin: urethane acrylate

Ultraviolet absorber 1 (product name: ADK STAB LA-46, hydroxyphenyl triazine ultraviolet absorber, manufactured by ADEKA CORPORATION): 2 parts by mass based on 100 parts by mass of the above resin Ultraviolet absorber 2 (product name: Tinuvin 1600, hydroxyphenyl triazine ultraviolet absorber, manufactured by BASF): 2 parts by mass based on 100 parts by mass of the above resin Hindered amine light stabilizer (product name: Tinuvin 123, manufactured by BASF): 3 parts by mass based on 100 parts by mass of the above resin A moisture curing and hot-melt urethan resin adhesive was applied onto the base body to form an adhesive layer having a thickness of 5 μm, attached to the obtained decorative material, and allowed to stand for 1 hour under environment of 90° C., thereby obtaining the decorative member.

Separately from this, samples were prepared using the obtained decorative material by the above method and evaluated. The results are shown in Table 1.

Examples 2 to 4, and Comparative Examples 1 and 2

The decorative materials and the decorative members of Examples 2 to 4 were prepared in the same manner as in Example 1 except the substrate and the resin layer in Example 1 were changed to the substrates and the resin layers, respectively, shown in Table 1. Using the obtained decorative materials, samples were prepared based on the above method and evaluated. The results are shown in Table 1.

TABLE 1

| | | Example | | | | Comparative Example | |
|---|---|---|---|---|---|---|---|
| | | 1 | 2 | 3 | 4 | 1 | 2 |
| Substrate | — | Polyolefin 1 | Polyolefin 2 | Polyolefin 3 | PVC1 | PVC2 | Polyolefin 4 |
| Resin layer | — | Polyolefin A | Polyolefin A | Polyolefin B | — | — | Polyolefin C |
| Water vapor transmission rate | $g/m^2 \cdot$ 24 h | 1.5 | 5 | 10 | 35 | 50 | 0.5 |
| Tensile modulus 60° C. | MPa | 410 | 320 | 115 | 350 | 1000 | 430 |
| Evaluation | | | | | | | |
| Application suitability | — | B | A | A | A | A | C |
| Long-term adhesion | — | A | A | A | B | C | A |
| Processing suitability | — | A | A | A | A | C | A |

In the above table, the substrates used in each of Examples and Comparative Examples are as follows.

Polyolefin 1: polypropylene resin sheet (propylene-ethylene random copolymer (ethylene content: 4.5% by mass or less), thickness: 80 μm, degree of crystallinity: 70%)

Polyolefin 2: polypropylene resin sheet (propylene-ethylene random copolymer (ethylene content: 4.5% by mass or less), thickness: 60 μm, degree of crystallinity: 50%)

Polyolefin 3: polypropylene resin sheet (propylene-ethylene random copolymer (ethylene content: 4.5% by mass or less), thickness: 60 μm, degree of crystallinity: 40%)

Polyolefin 4: polypropylene resin sheet (propylene-ethylene random copolymer (ethylene content: 4.5% by mass or less), thickness: 100 μm, degree of crystallinity: 70%)

PVC1: polyvinyl chloride resin sheet (thickness: 120 μm)

PVC1 was prepared by extrusion-molding a resin composition in which 38 parts by mass of a phthalate plasticizer (undecylic phthalate (DUP)) as a plasticizer was added based on 100 parts by mass of a polyvinyl chloride resin.

PVC2: polyvinyl chloride resin sheet (thickness: 120 μm)

PVC2 was prepared in the same manner as in PVC1 except the plasticizer in PVC1 above was changed to a polyester plasticizer (adipate polyester) and the content thereof was changed to 33 parts by mass based on 100 parts by mass of the polyvinyl chloride resin.

Polyolefin A: polypropylene resin (thickness: 80 μm)

Polyolefin B: polypropylene resin (thickness: 40 μm)

Polyolefin C: polypropylene resin (thickness: 100 μm)

The results of Table 1 verified that the decorative material of the present embodiment has excellent coating suitability due to the predetermined water vapor transmission rate, as well as the decorative member of the present embodiment which uses such a decorative material has the excellent long-term adhesion.

On the other hand, Comparative Example 1 verified that a water vapor transmission rate, which is too high, fails to obtain the excellent long-term adhesion because the decorative sheet degrades by the hydrolysis of the adhesive forming the adhesive layer and moisture in the atmosphere, and Comparative Example 2 additionally verified that a water vapor transmission rate, which is too low, fails to obtain the excellent application suitability because the adhesive forming the adhesive layer cannot achieve favorable curing condition and causes an initial tight contact strength to be lower.

INDUSTRIAL APPLICABILITY

The decorative material and the decorative member of the present embodiment have the excellent application suitability and long-term adhesion, and are therefore preferably used for an interior member of an architectural structure such as a wall, a ceiling, and a floor, or for an exterior member such as an outer wall, a roof, an eaves soffit, a railing, and a gate, for a window frame, for various doors such as a front door, for fittings or a fixture member such as a handrail, a skirting board, a crown molding, a window frame, a door frame, and a cable cover, for the surface decorative plate of a kitchen, furniture, or a light electrical appliance, a cabinet of an OA instrument, etc., and for an interior member or an exterior member of a vehicle.

REFERENCE SIGNS LIST

10: decorative material
1: substrate
2: decorative layer
2A: entire surface colored layer
2B: picture layer
3: adhesion layer
4: resin layer
5: primer layer
6: surface protective layer
20: decorative member
21: base body
22: adhesive layer

The invention claimed is:

1. A decorative member comprising:

a decorative material obtained by applying decoration treatment to a polyolefin resin substrate, and having a water vapor transmission rate when measured in accordance with Testing Methods for Determination of the Water Vapor Transmission Rate of Moisture-Proof Packaging Materials (Dish Method) defined in JIS Z0208:1976 of not less than 1.5 $g/m^2 \cdot 24$ h and not more than 35 $g/m^2 \cdot 24h$; and a base body with an adhesive layer disposed therebetween such that the polyolefin resin substrate of the decorative material and the base body face each other, wherein:

the adhesive layer is constituted by a urethane adhesive;

the urethane adhesive is a moisture curing adhesive;

the decorative material including:

the polyolefin resin substrate;

a decorative layer;

an adhesion layer;

a polypropylene resin layer that has a thickness of 40-80 μm; and a primer laver, the decorative material arranged in the following order the polyolefin resin substrate, the decorative layer, the adhesion laver, the resin laver, and the primer laver:

the polyolefin resin substrate is a propylene-ethylene random copolymer substrate; and the polyolefin resin substrate has a thickness of 20-80 μm and having a degree of crystallinity of not less than 40% and 70% or less.

2. The decorative member according to claim 1, the decorative material further comprising a surface protective layer provided at an outermost surface.

3. The decorative member according to claim 2, wherein the surface protective layer of the decorative material is a layer constituted by a cured product of a curable resin.

4. The decorative member according to claim 1, wherein a tensile modulus at 60° C. of the decorative material is not less than 80 MPa and not more than 600 MPa.

5. The decorative member according to claim 1, wherein the base body is a resin base body or a metal base body.

6. The decorative member according to claim 1, wherein the water vapor transmission rate of the decorative material is not less than 1.5 $g/m^2 \cdot 24$ h and not more than 10 $g/m^2 \cdot 24h$.

7. The decorative member according to claim 1, wherein the water vapor transmission rate of the decorative material is not less than 2.5 $g/m^2 \cdot 24$ h and not more than 10 $g/m^2 \cdot 24h$.

8. The decorative member according to claim 1, wherein a tensile modulus at 60° C. of the decorative material is not less than 110 MPa and not more than 420 MPa.

* * * * *